US010255709B2

United States Patent
Martin et al.

(10) Patent No.: US 10,255,709 B2
(45) Date of Patent: Apr. 9, 2019

(54) SYSTEM AND METHOD FOR CREATING A VIRTUAL BACKDROP

(71) Applicant: MorphoTrust USA, LLC, Billerica, MA (US)

(72) Inventors: Brian Martin, McMurray, PA (US); Zhiqiang Lao, Newtown, PA (US); Mohamed Lazzouni, Northborough, MA (US); Robert Andrew Eckel, Andover, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

(21) Appl. No.: 15/989,951

(22) Filed: May 25, 2018

(65) Prior Publication Data

US 2018/0276866 A1    Sep. 27, 2018

Related U.S. Application Data

(63) Continuation of application No. 15/013,368, filed on Feb. 2, 2016, now Pat. No. 9,996,958, which is a (Continued)

(51) Int. Cl.
*G06K 9/00* (2006.01)
*G06T 11/60* (2006.01)
(Continued)

(52) U.S. Cl.
CPC .......... *G06T 11/60* (2013.01); *G06K 9/00228* (2013.01); *G06T 7/12* (2017.01);
(Continued)

(58) Field of Classification Search
None
See application file for complete search history.

(56) References Cited

U.S. PATENT DOCUMENTS 5,469,536 A   11/1995   Blank
6,249,613 B1   6/2001   Crinon et al.
(Continued)

FOREIGN PATENT DOCUMENTS

EP   1833002   9/2007

OTHER PUBLICATIONS

Notification of Transmittal of the International Search Report and the Written Opinion of the International Searching Authority, or the Declaration, dated Nov. 14, 2014 from International Application No. PCT/US2014/048211, 14 pages.
(Continued)

*Primary Examiner* — Atiba O Fitzpatrick
(74) *Attorney, Agent, or Firm* — Fish & Richardson P.C.

(57) ABSTRACT

Some implementations may provide a method for generating a portrait of a subject for an identification document, the method including: receiving a photo image of the subject, the photo image including the subject's face in a foreground against an arbitrary background; determining the arbitrary background of the photo image based on the photo image alone and without user intervention; masking the determined background from the photo image; and subsequently generating the portrait of the subject for the identification document of the subject, the portrait based on the photo image with the determined background masked.

20 Claims, 11 Drawing Sheets obtaining a photo of a subject with any background generating a portrait of the subject with a Virtual Backdrop at time of capture using the portrait with the virtual backdrop for an photo identification document of the subject

Related U.S. Application Data continuation of application No. 14/341,238, filed on Jul. 25, 2014, now Pat. No. 9,286,685, which is a continuation-in-part of application No. 13/950,641, filed on Jul. 25, 2013, now Pat. No. 9,286,508.

(51) Int. Cl.
*G06T 7/73* (2017.01)
*G06T 7/12* (2017.01)
*G06T 7/194* (2017.01)
*G06T 7/136* (2017.01)

(52) U.S. Cl.
CPC .............. *G06T 7/136* (2017.01); *G06T 7/194* (2017.01); *G06T 7/75* (2017.01); *G06T 2207/10004* (2013.01); *G06T 2207/30201* (2013.01)

(56) References Cited

U.S. PATENT DOCUMENTS

| | | |
|---|---|---|
| 8,254,679 B2 | 8/2012 | Marchesotti |
| 2006/0153429 A1* | 7/2006 | Gehlen .............. G06K 9/00228 382/118 |
| 2006/0171004 A1 | 8/2006 | Hori |
| 2009/0167870 A1 | 7/2009 | Caleca et al. |
| 2011/0234779 A1 | 9/2011 | Weisberg |
| 2011/0280485 A1 | 11/2011 | Sairyo |
| 2013/0258138 A1 | 10/2013 | Ma |

OTHER PUBLICATIONS

Levin et al., "A Closed-Form Solution to Natural Image Matting," IEEE Transactions on Pattern Analysis and Machine Intelligence, vol. 30, No. 2, Feb. 2008, pp. 228-242.

Prestele et al., "System for the Automated Segmentation of Heads from Arbitrary Background," Fraunhofer HHI, Humboldt Universitat zu Berlin, German 4 pages.

Prestele et al., "System for the Automated Segmentation of Heads from Arbitrary Background," Fraunhofer Institute for Telecommunications, Heinrich Hertz Institute, http://www.hhi.fraunhofer.de, 13 pages.

\* cited by examiner

SYSTEM AND METHOD FOR CREATING A VIRTUAL BACKDROP

RELATED APPLICATIONS

This application is a continuation of U.S. application Ser. No. 15/013,368, filed Feb. 2, 2016, which is a continuation in part of U.S. patent application Ser. No. 13/950,641 filed Jul. 25, 2013. The disclosures of the application are incorporated by reference in their entirety for all purposes.

TECHNICAL FIELD

This document generally relates to identification document.

BACKGROUND

Identification cards are issued by government and non-government entities for identification purposes. Digital portraits for use on such identification documents are generally captured by following a number of standards that govern form, function, and esthetics.

SUMMARY

In one aspect, some implementations provide a method for generating a portrait of a subject for an identification document, the method including: receiving, at a mobile device, a photo image of the subject, the photo image including the subject's face in a foreground against an arbitrary background; determining the arbitrary background of the photo image based on the photo image alone and without user intervention; masking the determined background from the photo image; and subsequently generating the portrait of the subject for the identification document of the subject, the portrait based on the photo image with the determined background masked.

Implementations may include one or more of the following features. The method may further include determining the arbitrary background without calibrating the photo image against an additional photo image that includes either the subject or the background. The method may further include masking the determined background without storing data encoding the determined background.

Generating the portrait of the subject may further include: resizing portions of the foreground that correspond to the subject's face. Generating the portrait of the subject may further include: synthesizing a virtual backdrop in the generated portrait by replacing the masked background with a synthetic background, the synthetic background comprising a pattern pre-determined for the identification document. The method may further include: integrating the generated portrait with the synthesized virtual background on the identification document to identify the subject. Generating the portrait of the subject may further include: adjusting a window size of the subject's hair volume in the foreground.

The method may further include: providing a user interface to allow a user to adjust a window size of the subject's hair volume in the foreground. The method may further include: providing a user interface to allow a user to select a particular location in the photo image when the determined background has been masked and adjust corresponding color and brightness of the selected location in the photo image.

Generating the portrait may further include: tracing a contour that defines the background's boundary. Generating the portrait of the subject further comprises: providing a user interface to allow a user to trace a contour that defines the background boundary.

In another aspect, some implementations provide a mobile device that includes at least one processor configured to: receive a photo image of a subject taken for generating an identification document of the subject, the photo image including the subject's face in a foreground against an arbitrary background; determine the arbitrary background of the photo image based on the photo image alone and without user intervention; mask the determined background from the photo image; and subsequently generate the portrait of the subject based on the photo image with the background masked.

Implementations may include one or more of the following features. The at least one processor may be further configured to: determine the background without calibrating the photo image against an additional photo image that includes either the subject or the background. The at least one processor may be further configured to determine the arbitrary background by transmitting the photo image of the subject to a server for making the determination. The at least one processor may be further configured to generate the portrait of the subject by resizing portions of the foreground that correspond to the subject's face. The at least one processor may be further configured to generate the portrait of the subject for the identification document of the subject by replacing the masked background with a synthetic background, the synthetic background comprising a pattern pre-determined for the identification document. The at least one processor may be further configured to integrate the generated portrait on the identification document to identify the subject. The at least one processor may be further configured to replace the masked background without storing information encoding the determined background.

The mobile device may further include a camera device to adapted capture the photo image of the subject.

The at least one processor may be further configured to: adjust a window size of the subject's hair volume in the foreground. The at least one processor may be further configured to: provide a user interface to allow a user to adjust a window size of the subject's hair volume in the foreground. The at least one processor may be further configured to: provide a user interface to allow a user to choose a pixel in the photo image with the background masked and adjust pixel color and value for the chosen pixel. The at least one processor may be further configured to: trace a contour that defines the background's boundary. The at least one processor may be further configured to: providing a user interface to allow a user to trace a contour that defines the background boundary.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
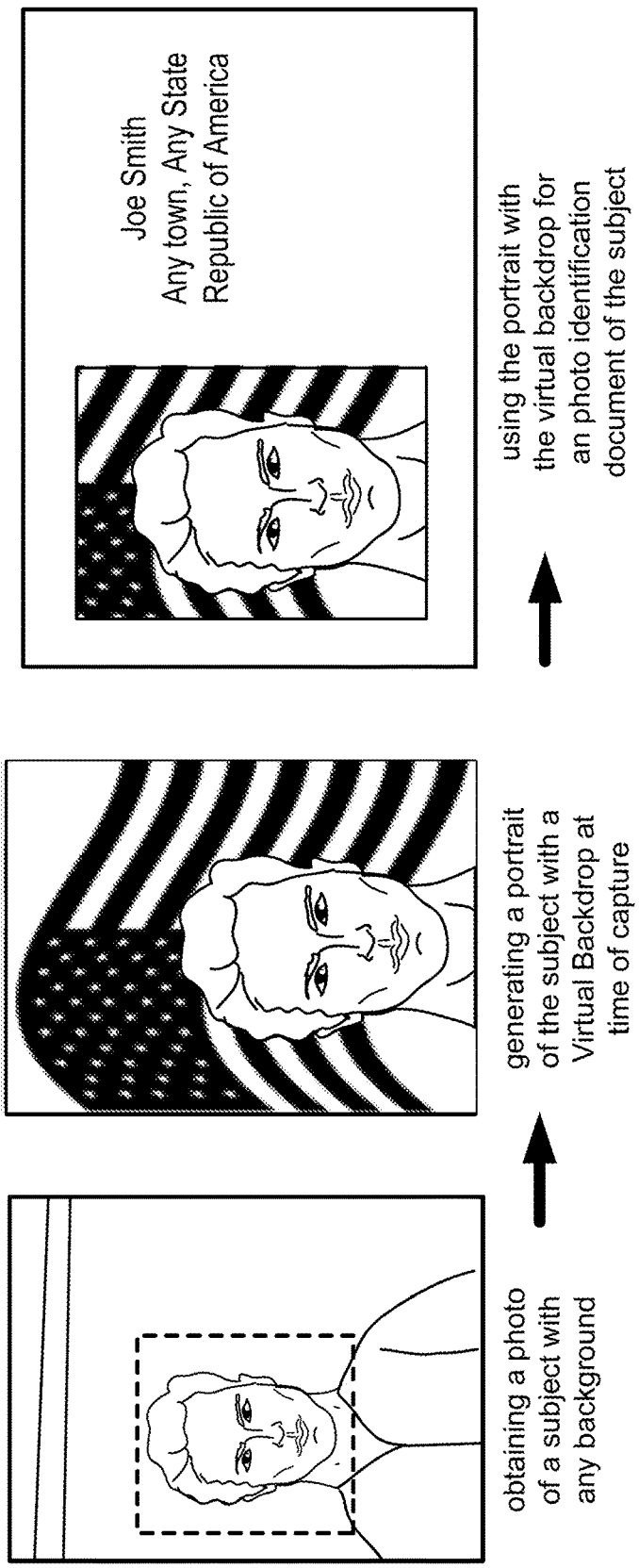
FIG. 1 illustrates an example work flow of generating a portrait with a virtual backdrop according to some implementations.

Digital portraits are used to create identification document such as identification cards and driver licenses. Such digital portraits follow standards that govern form, function, and esthetics. For example, the size of the portrait in a given field of view may be used to ensure that the collected photo image can be rendered by special printers so that the portrait can be printed on plastic substrates at sufficient viewable quality to identify the subject. At capture time, the photo image generally must meet certain resolution requirements. Additionally, the photo image generally must be frontal with a neutral expression. The photo image must be taken at a specific distance under sufficient illumination and free of shadows and bright spots. The captured photo image generally must scale properly.

Photo images of sufficient quality may be captured based on the above requirements. Such photo images, in turn, may lead to portraits of high quality and in compliance with International Civil Aviation Organization (ICAO) standards. These high quality portraits generally are configured to support facial recognition systems and may be used on identification documents to provide biometric facial recognition.

Generally, the photo image is captured against a neutral background. To ensure the capture of the photo image against a solid neutral color background, most jurisdiction mandate the use of a "physical backdrop" in which the subject may be required to stand in front of solid surface with a solid color (light blue, white, tan, light gray). Sometimes, a wall may provide the desired characteristics. Sometime a physical backdrop, like a pull-down screen, may be needed. Generally, the surface of the physical backdrop may be matte to reduce glare and reflection.

In many cases, however, it may be impossible or infeasible to control the background against which the digital portrait of a subject is captured. For example, mobile application may be developed on a mobile device to capture the photo image for the portrait for the subject. In this example, the subject may choose to upload the portrait for the identification card to an issuing authority. For example, jurisdictions may use ambulatory services to register people in less developed areas, such as the rural areas, in which locations of the ambulatory services may change from time to time. For example, some jurisdictions may outsource photo image capture to "tag agents" who do not have control over the space where the photo image capture takes place. In these example cases, a physical backdrop may become impractical to use and the background may differ considerably and can be noisy, leading to deterioration of image quality of the portrait. In some cases, the background may be arbitrary for lacking uniform lighting conditions or without a uniform color screen. In other words, the background may be without uniform illumination or color. Such background may become a challenge. If a portrait of inadequate quality is used on an identification document, the quality of subject recognition (as the purpose of the identification document) may be adversely affected.

Some implementations can remove an arbitrary background from a region of interest of a digital image to highlight a portrait. Some of these implementations may require a two-step process in which the background scene is imaged first, and then the subject is introduced with the background scene. Thereafter, the background scene may be subtracted to generate a portrait of the subject.

Some implementations may be include a one-step process and rely on image processing to (a) identify patterns unique to the foreground (corresponding to a portrait of the subject) and patterns unique to the background (for example, corresponding to a noisy scene), and (b) find the boundary between the foreground and the background by perform a best guess to isolate the former from the latter. These implementations may provide features to eliminate or change the background of a scene so that a portrait or a foreground object can be highlighted.

Generally, some implementations may require user intervention to segment the foreground from the background. For example, a user may take some steps using the application running on a computer. The user can also operate on a camera to navigate the menu and select menu options. For example, the menu options may allow the user to indicate regions that form the foreground or prescribe the edge of the foreground. The user operations may entail pushing a few mechanical buttons on the camera, tapping a touch-sensitive screen on the digital camera, etc. The user may select a filter, or mark up a boundary, or may adjust some parameters in the image or the special effects filters to get the desired outcome. In this application, a "fully automated" solution is proposed to create a "virtual backdrop" for portraits used for identification documents.

FIG. 1 illustrates an example work flow of generating a portrait with a virtual backdrop according to some implementations in which the portrait for an identification document can be generated from a variety of devices and in arbitrary conditions. In some cases, the devices may include mobile devices, such as a smartphone, a tablet, or a laptop. The devices may also include a desktop, a personal computer, a workstation, each equipped with, for example, a web cam. The devices may further include a kiosk for self-service. The kiosk may generally include a computer terminal with a touchscreen display, a camera device, a trackball device, and a keyboard device for interactions with a user. The kiosks may be deployed at, for example, a branch of the postal office, a branch of the department of motor vehicles, a registration office of an educational institution, a human resources office of a corporation, or a location in a mall. In these example cases, a physical backdrop may not be practical. As such, the background may include a uniform color screen. The background may not even be uniformly illuminated.

The left-most panel shows an example photo of a subject taken with an arbitrary background, for example, a window covered by vertical blinds. For the purpose of discussion herein, the face of the subject may form the foreground of the photo. The face of the subject may provide a basis for biometric identification of the subject when the identification document is presented by the subject for identification. The subject in the photo may not wear a hat or dark sun glasses. The subject may look straight into the mirror. The subject may also look slightly towards one side of the mirror. A variety of backgrounds of the photo may be supported. For example, in some configurations, the background may include any background, indoor or outdoor. The background may include a curtain of a uniform color. The background may also be the side of an ambulatory vehicle on a mission to the country side. The illumination condition in the background may vary across a range of luminance levels. In a particular image, for example, an image taken in the rural areas, the illumination may not be uniform. The photo may be taken by any operator, professional or amateur. The photo may be taken at a stationary office location, like the department of mobilized vehicles (DMV), the passport service of the post office, the registration office of an institution, etc. The photo may also be taken at an ambulatory vehicle, for example, deployed to the country side, to provide photo identification documents to people residing in the rural areas or otherwise without access to photo identifications.

The middle panel of FIG. 1 illustrates a facial portrait generated from the photo taken. The portrait shows the face of the subject against a virtual backdrop. The subject's face has been extracted from the photo as the foreground, for example, in a process known as alpha matting. The extracted face of the subject may be used for identification purpose. To provide proof that the extracted face has been endorsed by the issuing entity, a virtual backdrop may replace the original background. The virtual backdrop may be watermarked to uniquely identify the source of the portrait as coming from the issuing entity. Identification of the source of the portrait may provide a level of authentication for the identification document to which the portrait attaches. The virtual backdrop may also provide aesthetic appeals in addition to uniformity. Some virtual backdrops may provide a waving flag to elicit, for example, patriotic feelings from a viewer.

The right panel shows an identification card issued with the extracted facial portrait of the subject against the virtual backdrop. The identification card may include a government-issued identification card. Examples of government-issued identification cards may include a driver license, a passport, a permanent resident card, a social security card, a Medicare card, a Medicaid card, etc. A vetting process may be in place, for example, to check the background of the subject, before a government-issued identification card is produced. In some implementations, the vetting process may be conducted when the photo is taken and if approved, the identification may be produced on site. The vetting process may be a machine-assisted process including automated steps. The identification card may also be issued by a non-government entity, for example, an educational institution, a commercial entity such as corporation, a partnership, etc. The educational institute may issue cards to student or staff members for entering campus, libraries, or laboratories. The commercial entity can issue passes to employees or visitors for accessing buildings, offices, and facilities. A society or a club may also issue member cards. The identification card may have its own background with watermarks to identify the holder of the identification card or the issuing entity. The watermarks may include digital watermarks covert to naked eyes.

The identification card may be made of plastic, for example, polyvinyl chloride, polyethylene terephthalate based polyesters, acrylonitrile butadiene styrene or polycarbonate. The identification card may further incorporate embedded integrated circuits and may be used as a smart card which can provide data storage and application processing in addition to identification and authentication. For example, the integrated circuits may include a secure cryptoprocessor and a secure file system designed to encrypt the information stored in memory. The memory may include flash memory media, magnetic strips, read-only memory (ROM), erasable programmable read-only memory (EPROM), electrically erasable programmable read-only memory (EEPROM) etc. When used as a smart card, the identification card may be read by a reader apparatus capable of interfacing with the integrated circuits and obtaining information stored on the memory. The identification card may have the dimension of ID-1 according to the ISO/IEC 7810 standard as nominally 85.60 by 53.98 millimeters (3.370 in×2.125 in). Another dimension standard may be ID-000 which is nominally 25 by 15 millimeters (0.984 in×0.591 in). For both standards, the thickness is 0.76 millimeters (0.030 in).

The identification card with the subject's facial portrait may be visually inspected by a human operator to verify that the card is valid and authentic and the holder is the person whose portrait is on the card. The identification card may also be read by a reader apparatus that verifies the validity and authenticity of the identification card, for example, based on digital watermarks that can be covert. The reader apparatus may compare a captured image of holder with the portrait to ascertain whether the holder matches the person in the portrait. Additionally, the reader apparatus may read information from, for example, a magnetic strip on the identification card. The reader apparatus may further communicate with any integrated circuits on the identification card as described above.

In some implementations, the identification document may also include a digital identification document, for example, a digital driver license, a digital passport, a digital student card, a digital employee card, or a digital member card. The digital cards may parallel their corresponding physical equivalents. The digital cards may be displayed on a user's mobile device, such as the touch screen of a smartphone device. The display may be rendered by visualization software on the mobile device.

Figure 2:
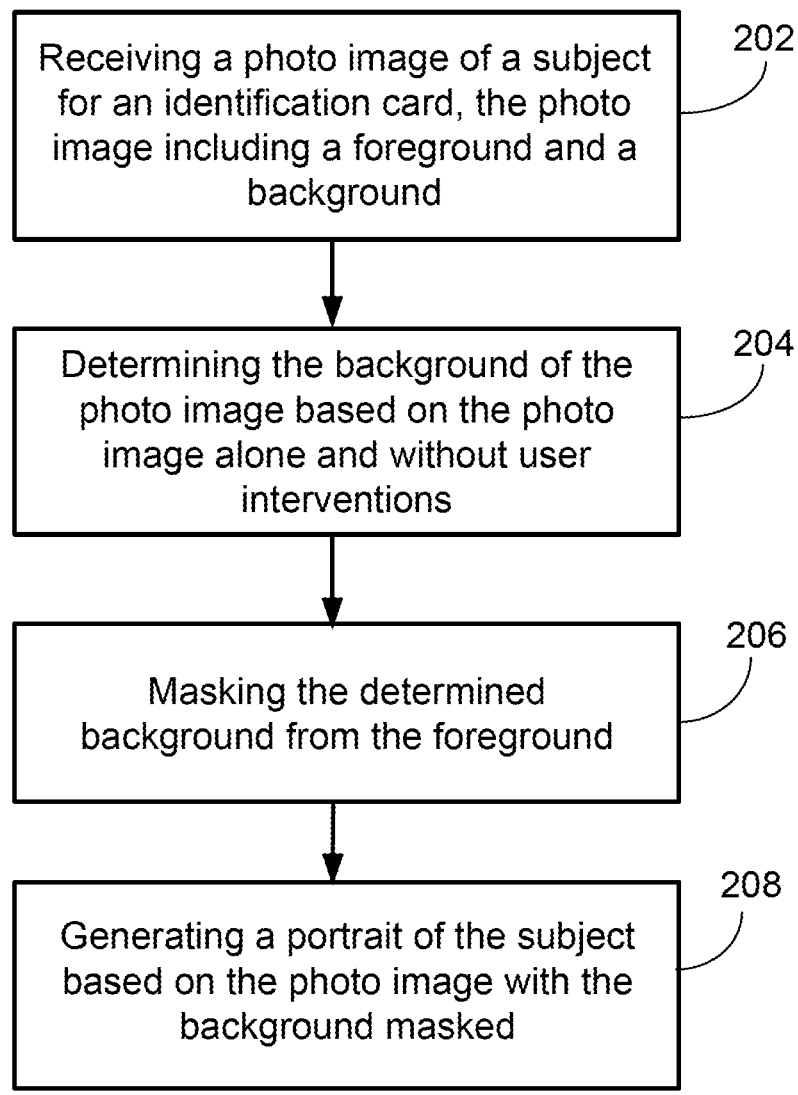
FIG. 2 is a flow chart showing an example method for generating a portrait with a virtual backdrop according to some implementations.

FIG. 2 is a flow chart showing an example method for generating a portrait with a virtual backdrop according to some implementations. First, a photo image of a subject is received (202). The photo image may be taken for the purpose of generating an identification card of the subject. In remote areas, such as, for example, the rural areas far away from metropolitan urban areas, small towns and villages away from large cities, fledgling democracies in the middle east or elsewhere in the world, the wide usage of identification cards may be impeded by the lack of infrastructure. Yet, wide usage of identification cards in these remote areas can help establishing an infrastructure of law and order. Nonetheless for identification cards to be widely used, photo of card holders may be obtained first. In this context, The photo image of the subject can be processed to generate a facial portrait of the subject for identification purposes.

To take photos from card holders in relatively remote and less urban areas, relatively less sophisticated equipment may be used and operators may not have received much training. The photo image can be taken by an operator with minimal training in photography or photo processing. Further, the photo image may be against an arbitrary background and under a variety of lighting conditions.

To generate an identification card at the time of taking the photo, the operator with minimal training is expected to process the photo on-site. For the identification card to be useful, the generated portrait should comply with rules of size, orientation, and background. Generally, a photo image taken of a subject may have a foreground and a background. The foreground may correspond to the subject's face while the background corresponds to the backdrop against which the photo was taken. As discussed above, the background can include any arbitrary background with no uniform illumination or color. The operator is expected to replace it with a desired background, such as a uniformly colored virtual backdrop, a template scenery etc.

Some implementations may replace such arbitrary background with a desired virtual backdrop. In these implementations, the arbitrary background can be determined and isolated automatically, i.e., without user intervention. For example, a programmed computing device may determine the background of the photo image based on the photo image alone and without additional data or user intervention (204). Thus, an operator with minimal training in photo processing can use the programmed computing device to generate portraits of the subject that comply with requirements as imposed by a particular jurisdiction.

Figure 3:
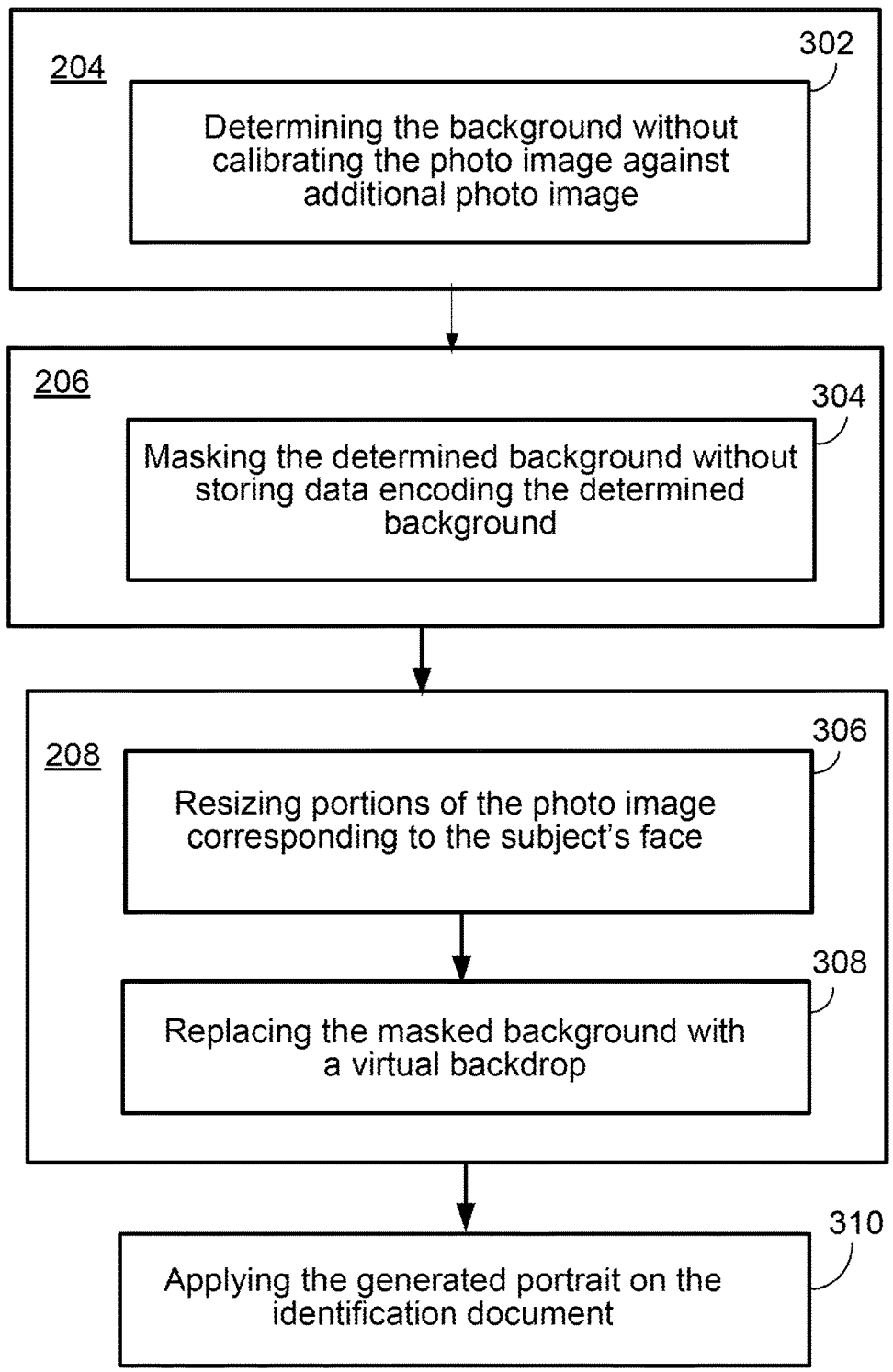
FIG. 3 is a flow chart showing details of the example method for generating a portrait with a virtual backdrop according to some implementations.

Referring to FIG. 3, the background may be automatically determined without calibrating the photo image against additional photo image (302). Calibrating may include any form of subtraction, including, for example, simple subtraction, subtraction after translation, rotation, or tilt, subtraction after scaling, exclusive or (XOR) operations, etc. The additional photo image means any pre-stored reference images or any additionally acquired photo images. In generating the portrait, the proposed method determines the background of the photo image without using any pre-stored reference images or any additionally acquired image. In other words, some implementations may automatically identify the background of the photo image without subtracting any pre-existing reference image, in stark contrast to some existing methods.

Turning to FIG. 2, subsequently, the automatically determined background may be masked from the foreground (206). By masking, pixels values corresponding to the determined background may be set to a special number to render such pixels void for the purpose of display. Once masked, the pixels corresponding to the background may not be displayed. For example, some implementations may mask the determined background as Not a Number (NaN) while maintain the rest the same value as before. The masking may be performed without storing data encoding the determined background (304), as illustrated by FIG. 3. Without storing the data encoding the determined background, subsequent photo images may not be calibrated against such determined background. Thus, a particular subsequent photo image may only be processed on its own and without information of the background from photo images previously acquired.

Turning to FIG. 2, the portrait of the subject may be generated based on the photo image with the determined background masked (208). Referring to FIG. 3, portions of the photo image corresponding to the subject's face may be resized to conform to requirements of portraits on the identification cards (306). These portions may include the foreground of the photo image. The foreground may be zoomed or shrank, depending on the size of the portion relative to the requirements. In some implementations, the foreground may also be rearranged in orientation, such as, for example, tilted to show sufficient details of the ear(s) or hair, etc.

Referring to FIG. 3, the masked background may be replaced with a virtual backdrop (308). The virtual backdrop may include a uniformly colored pattern, a striped pattern, a color gradient pattern, or any other pattern synthesized by a computer. The virtual backdrop may also include an image commonly associated with an organization, a trade, a product, etc. For example, the image can include, a flag, a tree, a building, a bridge, a landmark, etc. In fact, the virtual backdrop may include a trademark. Generally, a virtual backdrop may serve as a source identifier (e.g. the entity who is responsible for generating the portrait), a membership identify (e.g., the entity the subject in the portrait is associated with), or evince an emotion feeling (e.g., the feeling of being an American, a member of an educational institution, etc.)

The generated portrait with the virtual backdrop may then be applied to an identification document (310). As noted above, the identification document may include a passport, or a variety of identification cards, like a driver's license, a student card, a work badge, etc. The identification document may be generated on-site where the photo is taken, for example, in the remote areas where the populace who may otherwise be deprived of access to these identification documents. The identification document may be generated by printing apparatuses operated by the same person(s) who took and processed the photos. Hence, some implementations allow printing an identification card from various locations based on a multitude of apparatuses. Indeed, some implementations enable a scenario in which an issue can bring in a device of their own. The generated portrait may also be integrated on a digital identification document so that the digital identification document can be used to identify the holder.

Figure 4A:
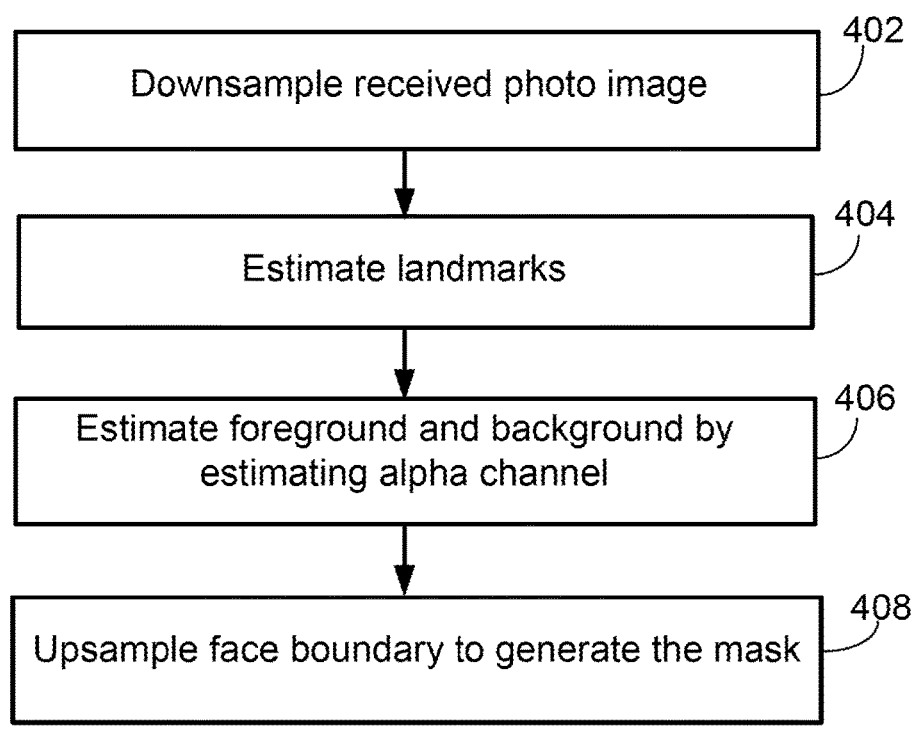
FIG. 4A is a flow chart showing an example method of estimating foreground and background according to some implementations.

FIG. 4A is a flow chart showing an example method of estimating foreground and background according to some implementations. The received photo image may be down sampled to an image of smaller size, known as the sparse image (402). The down sampling may improve processing efficiency. Thereafter, landmarks, including, for example, ear, head, forehead, mouse, chin, etc. may be estimated (404). The landmarks may be generally recognized regions on the human face. The landmarks may be estimated automatically without user intervention or input. Estimated landmarks may be used to generate an eclipse region as an initialization of face mask estimation.

Foreground and background of the photo image may be estimated by image matting (406). The image matting process may estimate an alpha channel. Specifically, Alpha matting is a technique to separate foreground from background in image. Alpha matting may model a given image according to Equation (1).

$$I = \alpha F + (1-\alpha) B \quad (1)$$

where I denotes image, F denotes foreground, B denotes background. Once the face boundary has been ascertained, the boundary may be upsampled to generate the mask for generating the portrait (408).

Figure 4B:
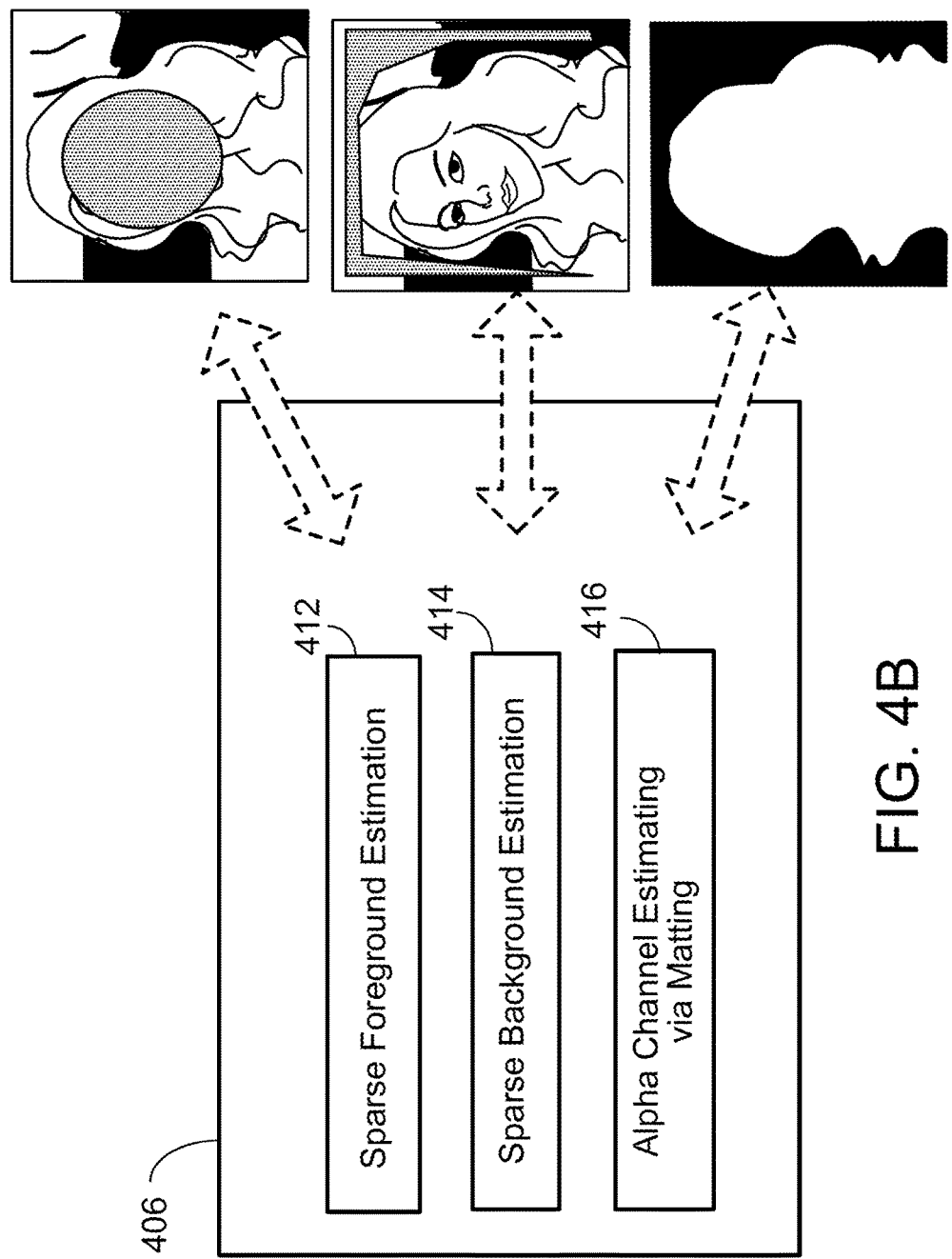
FIG. 4B illustrates an example process for estimation of foreground, background and alpha channel according to some implementations.

Referring to FIG. 4B, the estimation may include a sparse foreground estimation based on the down sampled photo image (412), as illustrated by the top panel on the right. The estimation may also include a sparse background estimation based on the down sampled photo image (414), as illustrated by the middle panel on the right. Starting from the already defined very sparse foreground and background pixels, some implementations may propagate the classifications to all unknown pixels in image, so that foreground and background can be separated. This is the alpha channel estimation process via matting (416), as illustrated by the bottom panel on the right.

Figure 4C:
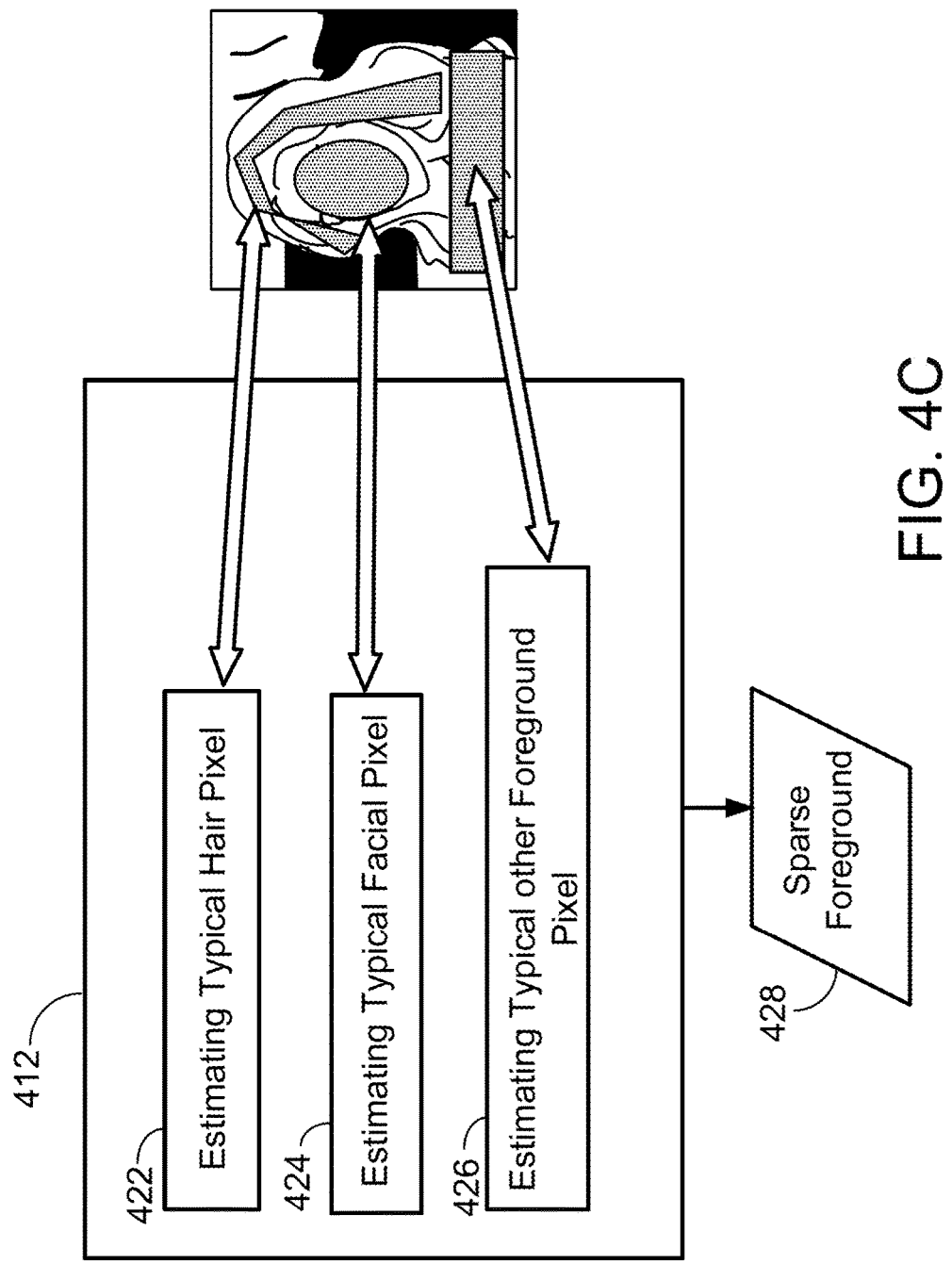
FIG. 4C illustrates an example estimation of the sparse foreground according to some implementations.

Referring to FIG. 4C, the estimation of foreground (412) may include estimating typical hair pixels (422), estimating typical facial pixels (424), and estimating typical other foreground pixels (426). In estimating typical hair pixels, some implementations may generate a hair mask according to the following Equation (2):

$$Mask_{hair} = CH(Eclipse(landmarkSet_1)) - CH(Eclipse(landmarkSet_2)) \quad (2)$$

where CH denotes a convex hull operation, Eclipse denotes an eclipse region formed by a set of landmarks, landmarkSet1 includes image pixels corresponding to left and right ear, headtop and chin, landmarkSet2 includes image pixels corresponding to left and right ears, forehead, and chin. Headtop is the region that covers the hop of the head, including the forehead region.

In estimating typical facial pixels, some implementations may generate a face mask according to the following Equation (3):

$$Mask_{face} = CH(RG(s)) \quad (3)$$

where CH denotes a convex hull operation, RG denotes the region growing operation, s is a seed region from which to generate the face mask. In some implementations, s can be formed by the image pixels corresponding to the left and right eyes.

In estimating other foreground pixels, some implementations may generate a mask for these pixels according to the following Equation (4):

$$Mask_{other} = CROSS\left(\frac{Chin + BB}{2}\right) \quad (4)$$

where Cross denotes the cross shape as illustrated by FIG. 4C, chin denotes the chin landmark, and BB denotes the chin landmark on the photo image's bottom boundary. As illustrated by FIG. 4C, sparse foreground 428 may be obtained based on the above estimations.

Figure 4D:
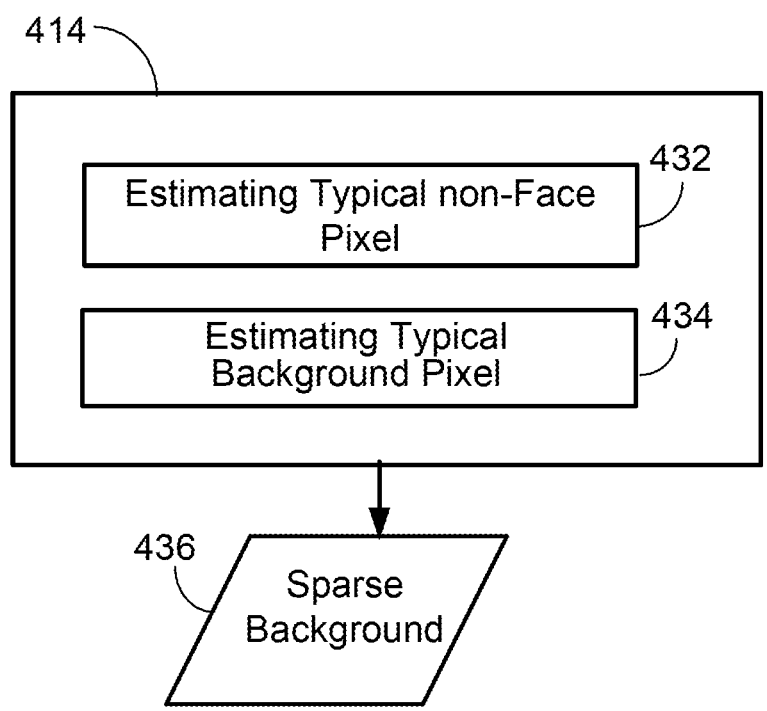
FIGS. 4D-4E illustrate an example estimation of the sparse background according to some implementations.

Referring to FIG. 4D, the estimation of background (414) may include estimating typical non-face pixels (432), and estimating typical background pixels (434). In some implementations, typical non-face pixels may be estimated as a probability function p generated according the following Equations (5)-(7):

$$(I^{hair}, \varnothing^{hair}, \lambda^{hair}) = PCA(I^{hair}) \quad (5)$$

$$\hat{b}_{i,j}^{non\ face} = \varnothing^{hair}(I_{i,j}^{non\ face} - I^{hair}) \quad (6)$$

$$\log p(\hat{b}_{i,j}^{non\ face}) = -0.5 \sum_{c=1}^{C} \frac{((\hat{b}_{i,j}^{non\ face})_c)^2}{\lambda_c^{hair}} + const \quad (7)$$

where $I^{hair}$ denotes intensity values of pixels within the hair mask, $I^{hair}, \varnothing^{hair}, \lambda^{hair}$ denote mean, eigen vectors, and eigen values generated by the principal component analysis (PCA), $I_{i,j}^{non\ face}$ denotes intensity values of pixel at coordinate (i,j) for the face mask, $\hat{b}_{i,j}^{non\ face}$ is the projection of, $I_{i,j}^{non\ face}$ on the PCA model, $p(\hat{b}_{i,j}^{non\ face})$ denotes the PCA-based probability of $I_{i,j}^{non\ face}$ to be a hair pixel.

In some implementations, typical background pixels may be estimated according the following Equation (8):

$$-\{(p(\hat{b}^{non\ face}) > t) + Eclipse(landmarkSet_2)\}|_{above\ eye\ level} \quad (8)$$

where t is the threshold for generating the binary hair mask. In some implementations, the final mask is defined as above the eye level. As illustrated by FIG. 4B, sparse background may be obtained based on the above estimates.

Figure 4E:
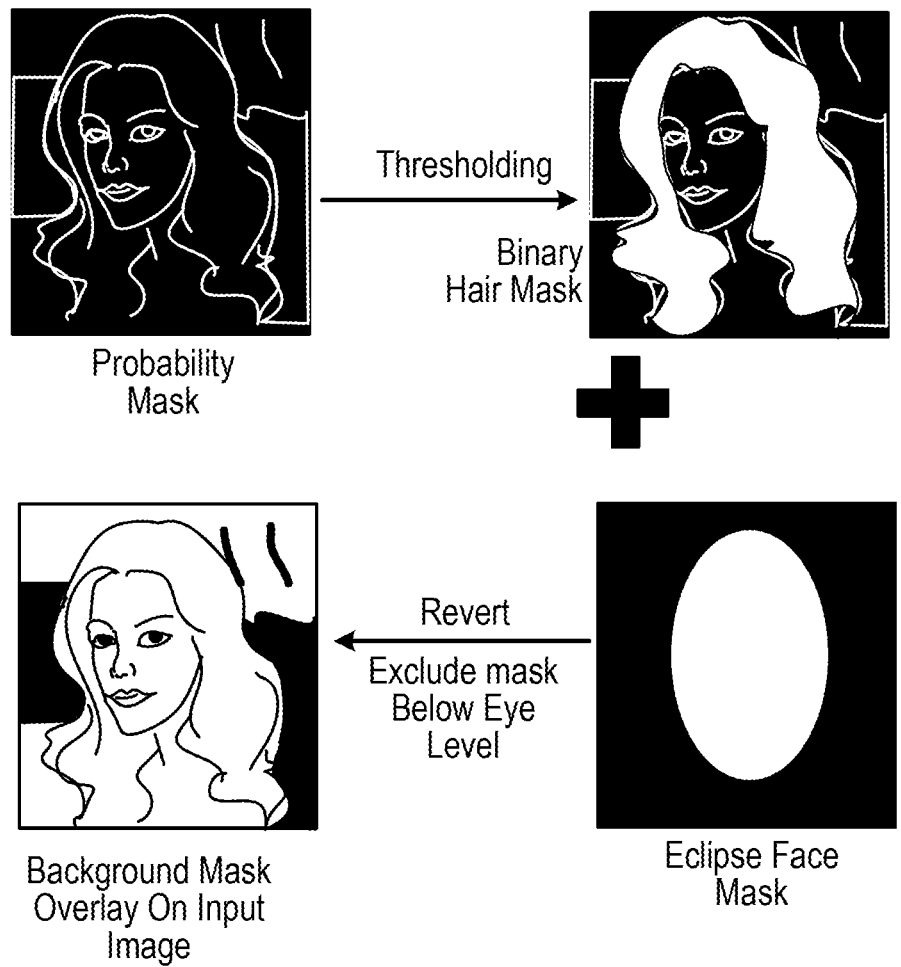

FIG. 4E shows an example of generating a background mask according to some implementations. A probability mask may be generated to denote the probability of each pixel being a hair pixel, for example, in accordance with Equations (5)-(7). An example probability mask for hair is shown in the upper left panel. Using a cut-off probability as a threshold, a binary hair mask may be generated, as illustrated by the upper right panel in FIG. 4E. This binary hair mask may then combined with an eclipse face mask, as shown in the lower right panel, to generate a background mask. An example background mask generated is overlaid on the input photo image, as illustrated by the lower left panel of FIG. 4E. In generating the example background mask, regions in the face mask that are below the eye level are excluded.

The sparse foreground estimate 428 and the sparse background estimate 436 may be used in image matting 416. Image matting may include affinity computation 442 and unknown pixel propagation 444. Assuming the color of each pixel in the input photo image is a linear combination of corresponding foreground and background colors, as defined by Equation (1), and assuming the foreground and the background in the input photo image is piece-wise uniform, alpha matting (i.e., the parameter α in Equation (1)) may be estimated for each pixel according the following Equation (9).

$$\sum_{k|(i,j)\in W_k} \left(\delta_{i,j} - \frac{1}{|W_k|}\left(1 + (I_i - \mu_k)\left(\sum_k + \frac{\varepsilon}{|W_k|}I_3\right)^{-1}(I_j - \mu_k)\right)\right) \quad (9)$$

where $W_k$ the number of pixels within a small neighbor of the pixel under analysis, $I_i$, $I_j$ are color values of pixels i and j, $\mu_k$ and $\Sigma_k$ are the mean and covariance matrix of pixel color values within the window of $W_k$, $I_3$ is a 3×3 identity matrix.

Figure 4F:
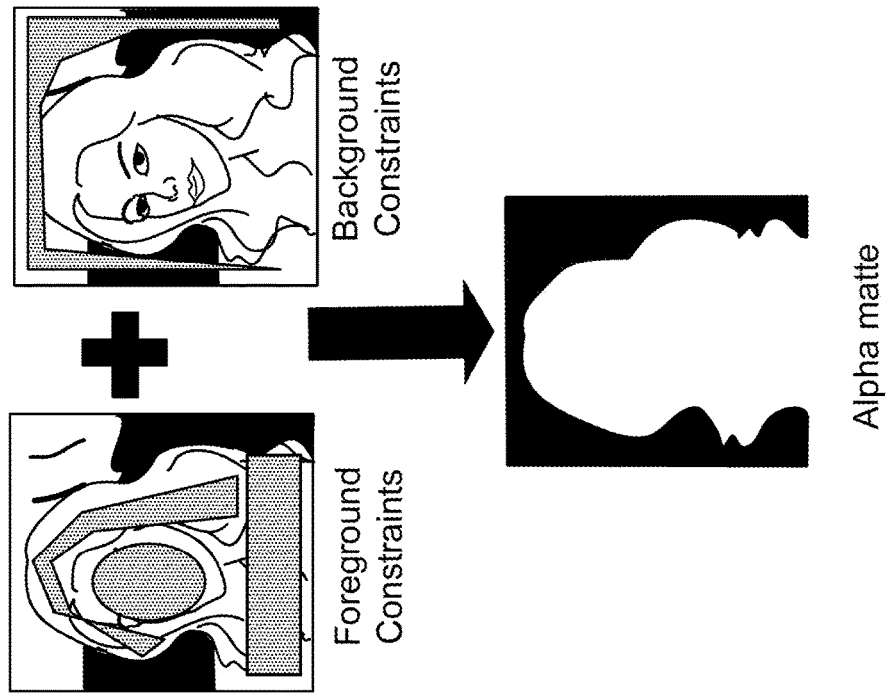
FIG. 4F illustrates an example alpha matting based on the sparse foreground and background according to some implementations.
Figure 4F:
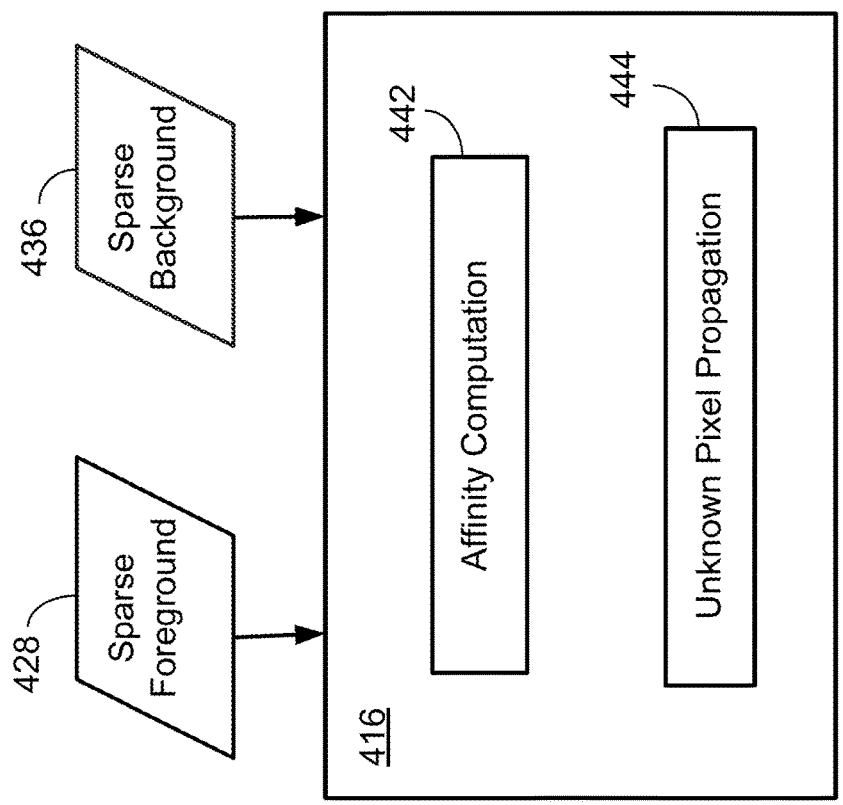

Sparse constraints definition may have sparse foreground pixels defined as 1 and sparse background pixels defined as 0. As demonstrated by the right panels on FIG. 4F, the sparse foreground constraints and the sparse background constraints may be combined and propagated to unknown pixels and whole image alpha matting estimation may be performed in accordance with Equation (9).

Figure 5A:
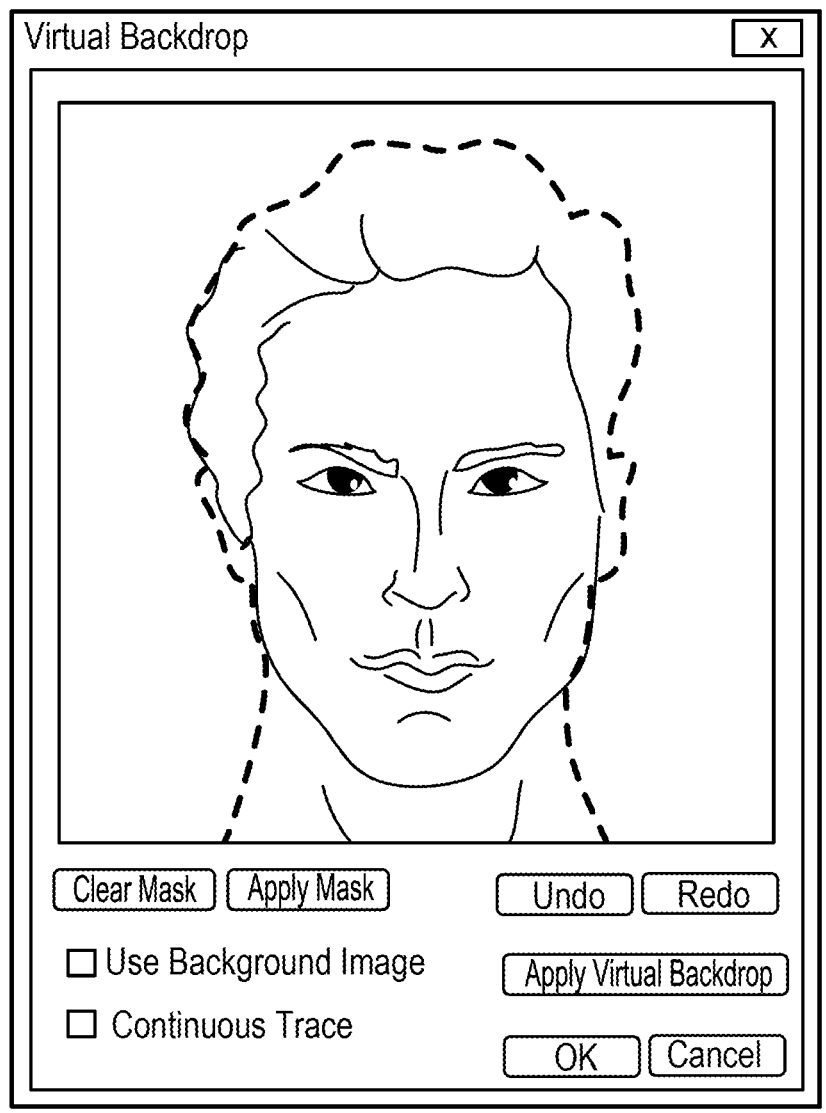
FIG. 5A illustrates an example of tracing a contour of a subject's face boundary according to some implementations.

In case where the boundary between the portrait of the subject and the background may need additional adjustments or touch-ups, tools for operator intervention may further improve the quality of the portraits. These tools may include, for example, a tracing tool to allow an operator to trace a contour and manually select where the background boundary starts and ends. FIG. 5A illustrates an example of tracing a contour of a subject's face boundary according to some implementations.

Figure 5B:
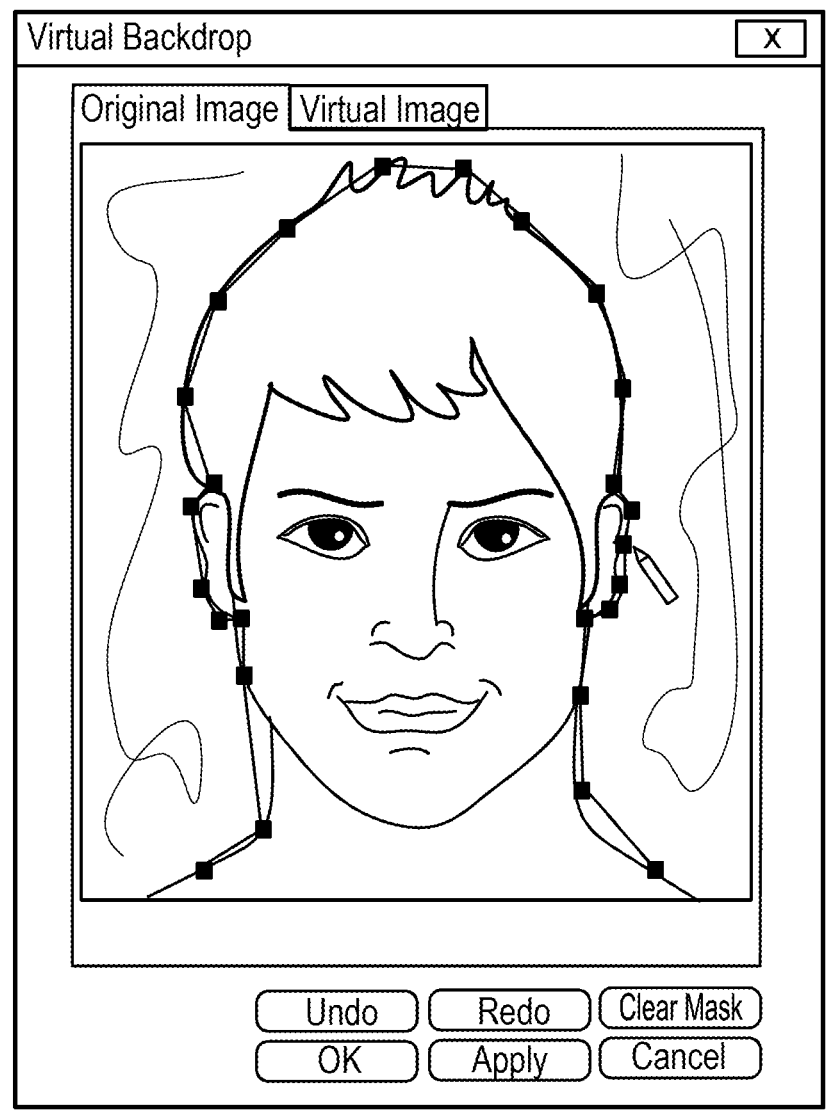
FIG. 5B illustrate illustrates an example of adjusting a subject's hair volume according to some implementations.

These tools may also include a hair filter as a sizing tool to allow the operator to adjust the window size of the subject's hair volume. FIG. 5B illustrate illustrates an example of adjusting a subject's hair volume using a hair filter tool according to some implementations.

These tools may additionally include local touch up tool. In some implementations, the local touch up tool may act as a magnifying glass to zoom in a specific area for touch up. Using the touch tool interface, an operator may adjust pixel color and values at a given location on the input photo image.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer implemented method for replacing a background in a digital portrait, the method comprising:
   obtaining a digital image of a subject, the digital image including the subject's face in a foreground against an arbitrary background;
   identifying a boundary between the arbitrary background and the foreground of the digital image based on an image matting process that includes determining a probability of each pixel being a boundary pixel that is between the foreground and the arbitrary background, wherein the identification is without calibrating a portion from the digital image against a portion from an additional image that includes either the subject or the arbitrary background;

masking the arbitrary background from the digital image based on the identified boundary; and generating a new portrait of the subject by replacing the masked arbitrary background with a virtual backdrop.

2. The method of claim 1, wherein identifying the boundary comprises:

automatically prescribing the boundary between the arbitrary background and the foreground where pixels of the boundary are determined by:

generating a first estimate of sparse foreground pixels and a second estimate of sparse background pixels; and combining the first estimate of sparse foreground pixels and the second estimate of sparse background pixels such that the combined estimates are propagated to unknown pixels without user intervention or calibrating a portion from the digital image against a portion of a different image.

3. The method of claim 1, wherein the virtual backdrop comprises a watermark.

4. The method of claim 1, further comprising masking the determined background without storing data encoding the identified background.

5. The method of claim 1, further comprising determining the arbitrary background that is without a substantially uniform illumination or color.

6. The method of claim 1, wherein generating the new portrait of the subject comprises resizing portions of the foreground that correspond to the subject's face.

7. The method of claim 1, wherein generating the new portrait of the subject comprises adjusting a region of interest of the subject's hair volume in the foreground.

8. The method of claim 1, further comprising providing a user interface to allow a user to adjust a region of interest of the subject's hair volume in the foreground.

9. The method of claim 1, further comprising providing a user interface to allow a user to select a particular location in the digital image when the identified background has been masked and subsequently adjust corresponding color or brightness of the selected particular location in the digital image.

10. The method of claim 1, wherein generating the new portrait comprises tracing a boundary that separates the foreground from the arbitrary background.

11. The method of claim 10, wherein generating the new portrait of the subject further comprises providing a user interface to allow a user to trace a boundary that separates the foreground from the arbitrary background.

12. The method of claim 1, wherein the arbitrary background in the digital image depicts an uncontrolled background that does not include a physical backdrop.

13. A non-transitory computer readable storage medium storing instructions that, when executed by at least one processor, cause the at least one processor to perform operations comprising:

obtaining a digital image of a subject, the digital image including the subject's face in a foreground against an arbitrary background;

identifying a boundary between the arbitrary background and the foreground of the digital image based on an image matting process that includes determining a probability of each pixel being a boundary pixel that is between the foreground and the arbitrary background, wherein the identification is without calibrating a portion from the digital image against a portion from an additional image that includes either the subject or the arbitrary background;

masking the arbitrary background from the digital image based on the identified boundary; and generating a new portrait of the subject by replacing the masked arbitrary background with a virtual backdrop.

14. The medium of claim 13, wherein identifying the boundary comprises:

automatically prescribing the boundary between the arbitrary background and the foreground where pixels of the boundary are determined by:

generating a first estimate of sparse foreground pixels and a second estimate of sparse background pixels; and combining the first estimate of sparse foreground pixels and the second estimate of sparse background pixels such that the combined estimates are propagated to unknown pixels without user intervention or calibrating a portion from the digital image against a portion of a different image.

15. The medium of claim 13, wherein the virtual backdrop comprises a watermark.

16. The medium of claim 13, wherein the operations further comprise masking the determined background without storing data encoding the identified background.

17. The medium of claim 13, wherein the operations further comprise determining the arbitrary background that is without a substantially uniform illumination or color.

18. The medium of claim 13, wherein the operations further comprise providing a user interface to allow a user to select a particular location in the digital image when the identified background has been masked and subsequently adjust corresponding color or brightness of the selected particular location in the digital image.

19. The medium of claim 13, wherein generating the new portrait comprises:

tracing a boundary that separates the foreground from the arbitrary background; and providing a user interface to allow a user to trace a boundary that separates the foreground from the arbitrary background.

20. A system comprising:

at least one processor; and at least one data store coupled to the at least one processor having instructions stored thereon which, when executed by the at least one processor, causes the at least one processor to perform operations comprising:

obtaining a digital image of a subject, the digital image including the subject's face in a foreground against an arbitrary background;

identifying a boundary between the arbitrary background and the foreground of the digital image based on an image matting process that includes determining a probability of each pixel being a boundary pixel that is between the foreground and the arbitrary background, wherein the identification is without calibrating a portion from the digital image against a portion from an additional image that includes either the subject or the arbitrary background;

masking the arbitrary background from the digital image based on the identified boundary; and generating a new portrait of the subject by replacing the masked arbitrary background with a virtual backdrop.

* * * * *